(12) United States Patent
Kwon et al.

(10) Patent No.: US 9,203,093 B2
(45) Date of Patent: Dec. 1, 2015

(54) FUEL CELL ELECTRODE

(75) Inventors: Nak Hyun Kwon, Seoul (KR); In Chul Hwang, Gyeonggi-do (KR); Jae Seung Lee, Gyeonggi-do (KR); Bum Wook Roh, Gyeonggi-do (KR); Yung Eun Sung, Gyeonggi-do (KR); Ju Wan Lim, Seoul (KR); Yoon Hwan Cho, Gyeonggi-do (KR); Nam Gee Jung, Seoul (KR); Hee Man Choe, Gyeonggi-do (KR); Yong Hun Cho, Gyeonggi-do (KR)

(73) Assignees: Hyundai Motor Company, Seoul (KR); SNU R&DB Foundation, Seoul (KR)

( * ) Notice: Subject to any disclaimer, the term of this patent is extended or adjusted under 35 U.S.C. 154(b) by 763 days.

(21) Appl. No.: 13/176,954

(22) Filed: Jul. 6, 2011

(65) Prior Publication Data
US 2012/0244457 A1    Sep. 27, 2012

(30) Foreign Application Priority Data
Mar. 21, 2011   (KR) ..................... 10-2011-0025067

(51) Int. Cl.
*H01M 4/86* (2006.01)
*H01M 4/88* (2006.01)
*H01M 8/10* (2006.01)

(52) U.S. Cl.
CPC .......... *H01M 4/8825* (2013.01); *H01M 4/8807* (2013.01); *H01M 4/8892* (2013.01); *H01M 2008/1095* (2013.01); *Y02E 60/50* (2013.01)

(58) Field of Classification Search
CPC .................................. H01M 4/86; H01M 4/88
USPC .............. 429/400–535; 427/115; 501/25–39; 502/101
See application file for complete search history.

(56) References Cited

U.S. PATENT DOCUMENTS

2002/0146616 A1* 10/2002 Yasuo et al. .................... 429/44
2004/0086772 A1* 5/2004 Chianelli et al. ................ 429/40

FOREIGN PATENT DOCUMENTS

| CN | 1617765 A | 5/2005 |
|---|---|---|
| CN | 1625815 A | 6/2005 |
| CN | 1967916 A | 5/2007 |
| CN | 101219360 A | 7/2008 |
| JP | 10223233 A | 8/1998 |
| JP | 2003323896 A | 11/2003 |
| KR | 10-0629290 | 9/2004 |

* cited by examiner

*Primary Examiner* — Kenneth Douyette
*Assistant Examiner* — James Lee
(74) *Attorney, Agent, or Firm* — Mintz Levin Cohn Ferris Glovsky and Popeo, P.C.; Peter F. Corless

(57) ABSTRACT

The present invention provides an electrode for a polymer electrolyte membrane fuel cell. In one embodiment, a planar nanoporous or microporous metal foam or metal aerogel structure is provided, from which an electrode with a catalyst layer integrally formed by fixing a catalyst in the metal foam or metal aerogel is formed.

8 Claims, 5 Drawing Sheets

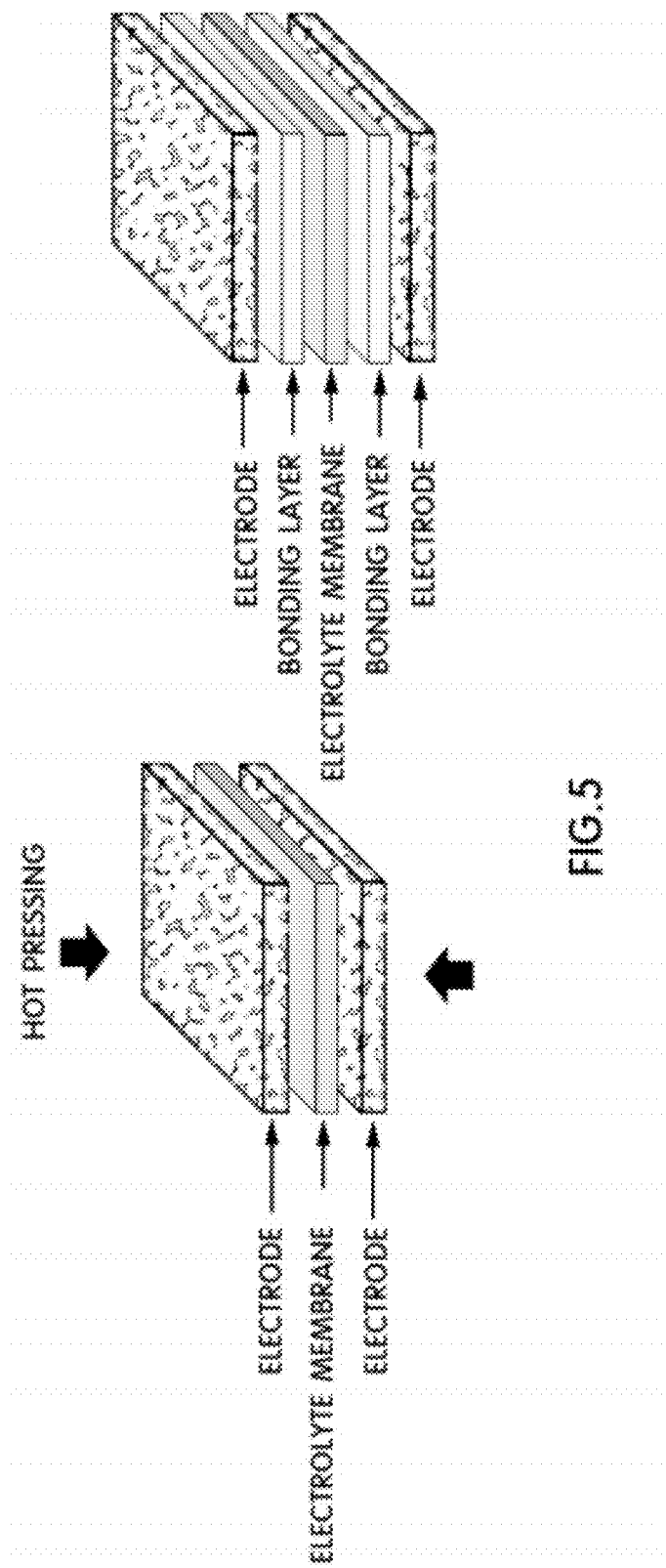

FUEL CELL ELECTRODE

CROSS-REFERENCE TO RELATED APPLICATION

This application claims under 35 U.S.C. §119(a) the benefit of Korean Patent Application No. 10-2011-0025067 filed Mar. 21, 2011, the entire contents of which are incorporated herein by reference.

BACKGROUND (a) Technical Field

The present invention relates to an electrode for a fuel cell. More particularly, it relates to an electrode having a pore structure of various sizes and distributions while maintaining an appropriate catalyst layer and pore structure during the operation of a fuel cell.

(b) Background Art

A fuel cell is an electricity-generating device that electrochemically converts chemical energy of fuel into electrical energy in a fuel cell stack instead of converting chemical energy of fuel into heat by combustion. Fuel cells may not only provide power for industries, households, and vehicles, but may also be applied to power supply for small-sized electrical/electronic products, particularly, portable devices.

Currently, Polymer Electrolyte Membrane Fuel Cells (PEMFCs) having a higher power density are being extensively studied as a power supply source for driving vehicles. PEMFCs have a quick startup time and a quick power conversion response time due to a low operating temperature.

Such a polymer electrolyte membrane fuel cell includes a Membrane-Electrode Assembly (MEA) with catalyst electrodes attached to both sides of a polymer electrolyte membrane through which hydrogen ions move, a Gas Diffusion Layer (GDL) for evenly distributing reaction gases and serving to deliver electrical energy that is generated, gaskets and coupling members for maintaining airtightness of reaction gases and cooling water and appropriate coupling pressure, and a bipolar plate that allows the reaction gases and the cooling water to move.

When a fuel cell stack is assembled using such a unit cell, a combination of a membrane-electrode assembly and a gas diffusion layer as a main component is located at the innermost portion thereof. The membrane-electrode assembly includes catalyst electrode layers, i.e., cathode and anode with a catalyst coated on both surfaces of the polymer electrolyte membrane, which allows hydrogen (fuel) and oxygen (oxidant) to react with each other. In addition, gas diffusion layers and gaskets are stacked on the outside of the cathode and the anode.

On the other hand, when a membrane-electrode assembly is fabricated by bonding the catalyst electrodes to the both surfaces of the polymer electrolyte membrane, the catalyst layer structure of the catalyst electrode and the core structure are controlled by membrane-electrode assembly fabrication methods such as decal transfer method, screen print method, brush method, inkjet method, and spray method.

Currently, methods available for mass production of membrane-electrode assemblies are limited to the decal transfer method and the screen print method. The decal transfer method includes coating catalyst slurry on the surface of a release film and then drying the catalyst slurry to form a catalyst electrode layer, stacking a release film with a catalyst layer on both surfaces of an electrolyte membrane, and transferring the catalyst layer to both surfaces of the electrolyte membrane using a hot pressing method.

In a method for fabricating a membrane-electrode assembly suitable for mass production, a pore former is used to control a catalyst layer structure of a catalyst electrode and a pore structure. However, there is a difficulty in removing the pore former.

The use of organic solvents or heat-treatment in a process of removing the pore former affects other components such as the catalyst, and is time-consuming.

In a typical catalyst electrode structure in which catalyst is fixed on a carbon support, since the carbon support corrodes due to the long time operation of a fuel cell, the catalyst layer structure and the pore structure may be deformed, and corrosion and burning damage of the carbon support may cause a loss of active platinum catalyst.

In a method of using a gas diffusion layer formed of carbon fiber as an electrode to support a thin catalyst layer, there is a limitation in mobility of material due to a difference of pore size between the catalyst layer and the electrode (gas diffusion layer).

Also, there is a limitation of excessive interface resistance and interface separation between a catalyst layer and an electrode (gas diffusion layer). Although attempts to improve the mobility of material and minimize the interface resistance with the catalyst layer using a microporous layer are being made, there is still a difficulty in controlling the hydrophilic property and pore structure of the microporous layer.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides to a method for manufacturing an electrode for a fuel cell and the fuel cell electrode. More specifically, it relates to a method for manufacturing an electrode, which has pore structures of various sizes and distributions while maintaining a suitable catalyst layer and pore structure during the operation of a fuel cell, and can easily control the catalyst layer structure and the pore structure.

In one aspect, the present invention provides a method for manufacturing an electrode for a polymer electrolyte membrane fuel cell, comprising: providing a planar nanoporous or microporous metal foam or metal aerogel structure; and forming an electrode with a catalyst layer integrally formed by fixing a catalyst in the metal foam or metal aerogel.

In an illustrative embodiment, the providing of the planar nanoporous or microporous metal foam or metal aerogel structure may include: forming metal foam or metal aerogel having a large pore size; forming metal foam or metal aerogel having a relatively small pore size; alternatively stacking the metal foam or metal aerogel having the different pore sizes; and laterally cutting the stacked metal foam or metal aerogel into a planar structure to form metal foam or metal aerogel having various pore sizes.

In another illustrative embodiment, the metal foam or the metal aerogel may have an open pore structure in which gases and liquids move, and a metal-connected structure in which electrons move.

In still another illustrative embodiment, the method may further include impregnating the electrode with ion conductive material.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein:

FIG. 5 is a diagram illustrating a method for a membrane-electrode assembly using a modularized electrode with a catalyst layer integrally formed using metal foam or metal aerogel according to an exemplary embodiment of the present invention.

Figure 1:
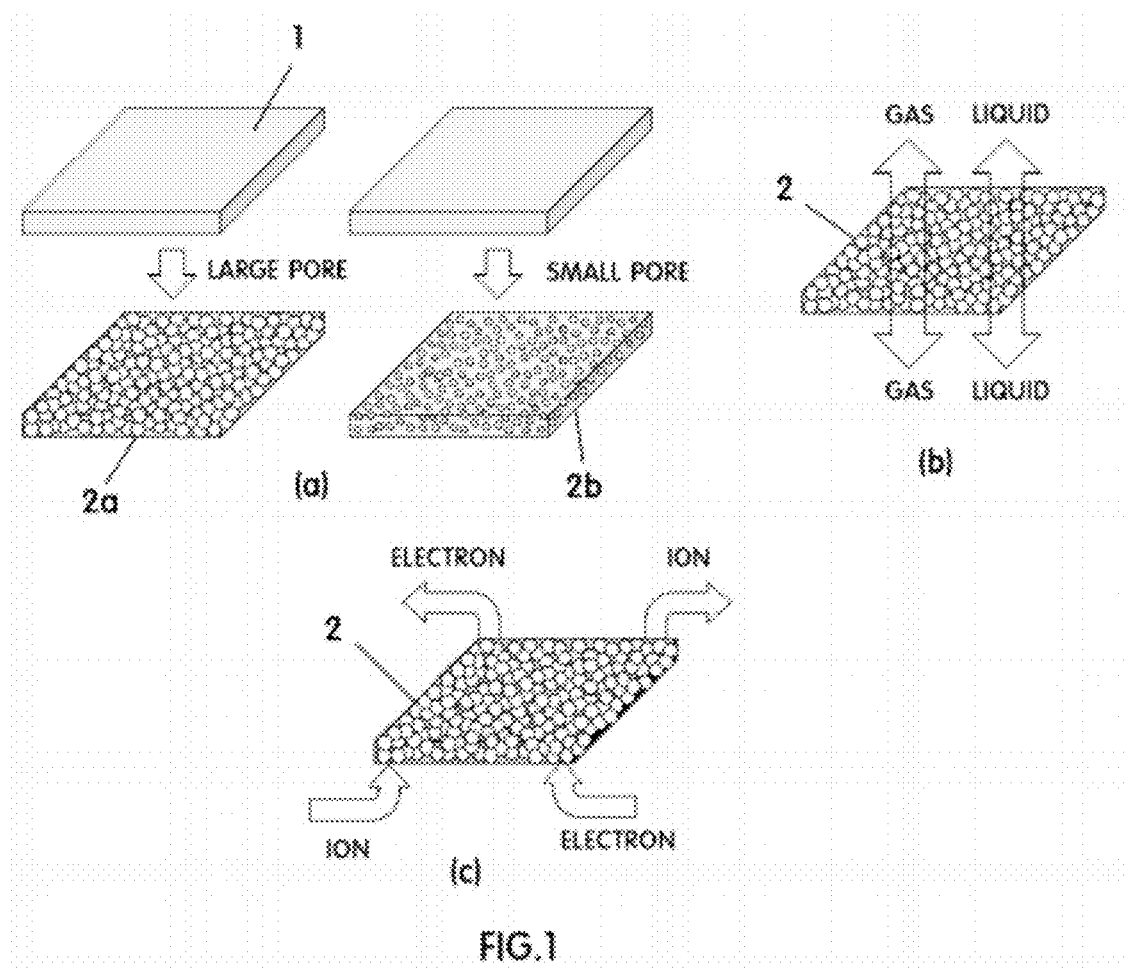
FIG. 1 is a diagram illustrating metal foam or metal aerogel having a larger pore structure, and metal foam or metal aerogel having a relatively smaller pore structure.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Also, it is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Hereinafter, exemplary embodiments of the present invention will be described in detail with reference to the accompanying drawings so that they can be readily implemented by those skilled in the art.

The present invention is characterized in that an electrode with a catalyst layer is integrally formed using metal foam or metal aerogel having pores of nano- or micro-size as a support body (also, electrode body) that maintains the structures of the catalyst layer and pores.

Technology for manufacturing nanoporous metal foam or metal aerogel has been recently developed, and the present invention relates to a method for manufacturing a catalyst electrode that can maintain the structure and distribution of pores suitable to the operation of a polymer electrolyte membrane fuel cell using the metal foam or metal aerogel as a support body.

A manufacturing process of the present invention may include providing planar metal foam or metal aerogel having a nanoporous or microporous structure and fabricating a modularized electrode with a catalyst layer integrally formed by fixing a catalyst in the metal foam or metal aerogel.

FIG. 1 is a diagram illustrating (in FIG. 1(*a*)) metal foam 2*a* or metal aerogel having a larger pore structure, and metal foam 2*b* or metal aerogel having a relatively smaller pore structure, both referred to generally as "metal foam 2 or metal aerogel" or simply a "porous metal structure".

A porous metal foam 2 or metal aerogel having a pore size of about 1 nm to about 100 μm that is needed in a catalyst electrode for a fuel cell, using a metal plate 1 formed of elements such as Pd, Ni, Ti, Fe, Cu, Pt, and Au may be manufactured. Examples of methods for manufacturing the metal foam or metal foam having a pore size of about 1 nm to about 100 μm using elements such as Pd, Ni, Ti, Fe, Cu, Pt, and Au may include a combustion synthesis method and a self-propagating high-temperature synthesis method.

A method for manufacturing porous metal foam or metal aerogel may also be applied, such as by forming a metal plate containing two or more metals or a metal plate with one or more metals and a pore-forming agent mixed, and then removing one or more materials from them.

In the process of manufacturing metal foam and metal aerogel, various pore structure control technologies may be applied, and thus metal foam or metal aerogel having a pore structure similar to that of a catalyst electrode of a typical polymer electrolyte membrane fuel cell may be manufactured.

In the metal foam or metal aerogel that is manufactured by the above process, most pores may exist in the form of open pores in which pores are connected to each other to allow gas and liquid to move, and the size and distribution of pores may be similar to those of a catalyst electrode of a typical polymer electrolyte membrane fuel cell.

In this case, metal foam or metal aerogel that exists in a state where a portion or the entirety of the surface of pore is oxidized may also be applied.

Similar to a typical catalyst electrode, the metal foam 2 or the metal aerogel used in the present invention must have a pore structure that facilitates movement of hydrogen (fuel) and air (oxidant) (see FIG. 1(*b*)) that are reaction gases for an electrochemical reaction (see FIG. 1(*c*)), movement of electrons and ions that are generated in the reaction, and discharge of water.

Also, the metal foam 2 or the metal aerogel has an open pore structure of easily passing liquid and gas, and a metal structure in which electrons can move. Accordingly, it is appropriate to use porous metal foam or metal aerogel having a pore size of about 1 nm to about 100 μm.

Figure 2:
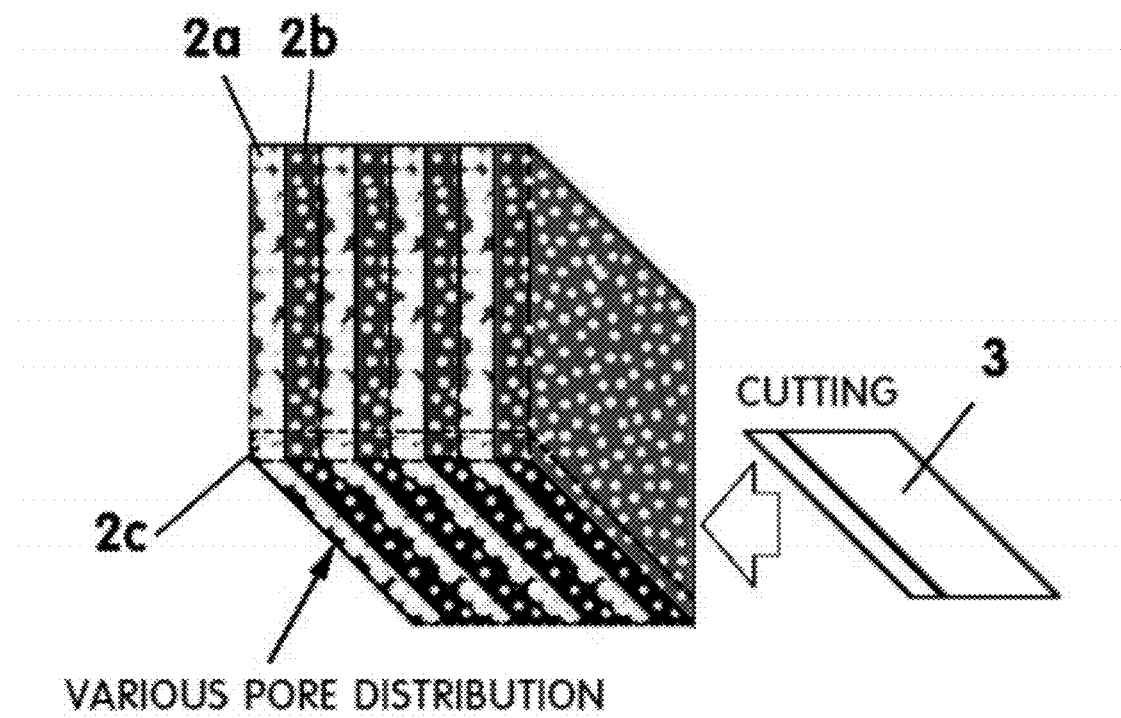
FIG. 2 is a diagram illustrating a process of manufacturing a metal foam or metal aerogel planar structure having various pore sizes and distributions according to an exemplary embodiment of the present invention.

Similar to a typical catalyst electrode for a fuel cell, if necessary, it is appropriate to use porous metal foam or metal aerogel having a metal structure that can be impregnated with ionomer, that is, ion conductive material FIG. 2 is a diagram illustrating a process of manufacturing a metal foam or metal aerogel planar structure having various pore sizes and distributions according to an exemplary embodiment of the present invention.

In order to manufacture a planar metal foam or metal aerogel structure mixed with pores of various sizes, as shown in FIG. 1, a planar metal foam 2a or metal aerogel having larger pores may be manufactured, and a planar metal foam 2b or metal aerogel having relatively smaller pores may be manufactured. Thereafter, the planar metal foam 2a and the planar metal foam 2b may be alternately stacked, and then may be laterally cut by a cutting device 3 to have a planar structure of a certain thickness.

Examples of methods for manufacturing metal foam having various pore structures of nano- or micro-size may include a powder sintering method, an argon gas expansion method by addition of, e.g., argon gas, and a preformed slurry manufacturing method. The metal foam manufacturing methods described above can also be applied.

When the stack of the planar metal foam 2a and the planar metal foam 2b is laterally cut, it is possible to manufacture a planar metal foam or metal aerogel having both larger pores and smaller pores.

In the stacking process, examples of method for bonding the metal foam and the metal aerogel may include a hot pressing method, a typical pressure process, and a method of using a bonding layer.

Thus, by using various one or more kinds of metal materials, metal foam or metal aerogel having various pore size and distributions can be manufactured.

Thereafter, a modularized electrode with a catalyst layer integrally formed using the metal foam 2 and 2a to 2c or metal aerogel may be manufactured. In this case, a known process of forming a catalyst material and a catalyst layer can be applied. In this case, various methods may be applied in which metal foam or metal aerogel is impregnated with synthesized catalyst or catalyst is directly synthesized or coated on the surface of the metal foam or the metal aerogel.

Figure 3:
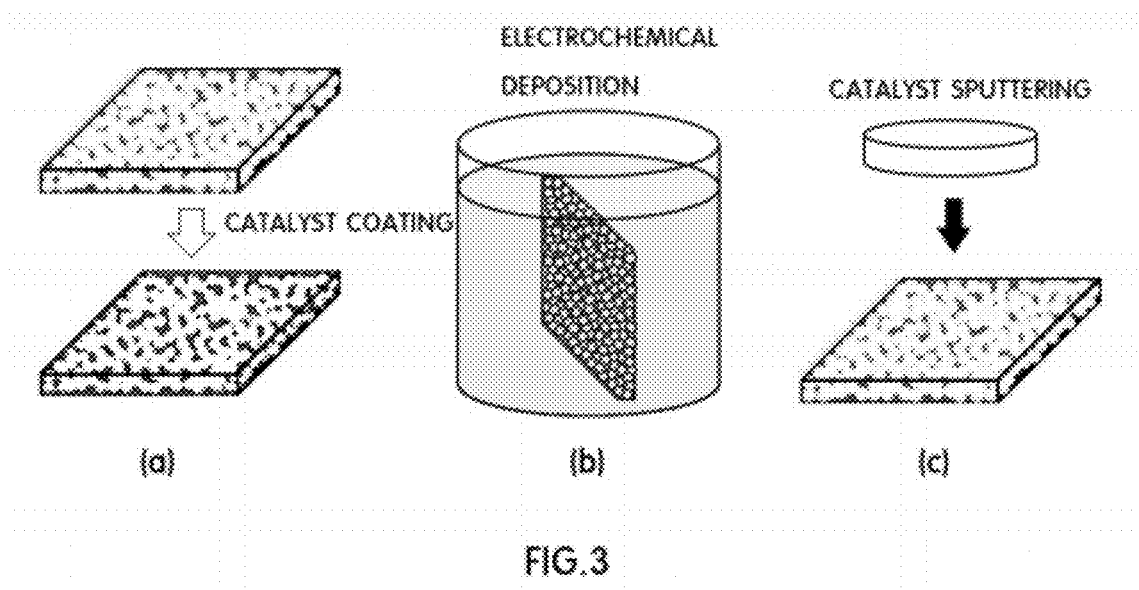
FIG. 3 is a diagram illustrating a process of manufacturing a modularized electrode with a catalyst layer integrally formed using a metal foam or metal aerogel according to an exemplary embodiment of the present invention.

FIG. 3 is a diagram illustrating a process of manufacturing a modularized electrode with a catalyst layer integrally formed using a metal foam or metal aerogel according to an exemplary embodiment of the present invention.

As an example of a process for forming a catalyst layer (FIG. 3(a)), platinum catalyst particles or platinum alloy catalyst particles of several nanometer size may be coated and deposited on the surface of the metal foam 2 and 2a to 2c or metal aerogel may be used as a catalyst layer of a typical polymer electrolyte membrane fuel cell In an alternative method, catalyst may be synthesized through a typical platinum or platinum alloy catalyst particle synthesis method in which a precursor of platinum or platinum alloy catalyst is melted in organic or inorganic solvent and then reduced. A modularized electrode with a catalyst layer integrally formed may be manufactured by disposing the synthesized catalyst in the inside or outside, or both sides of metal foam or metal aerogel.

A modularized electrode coated with thin film catalyst may be manufactured by using an electrochemical deposition method (FIG. 3(b)) or an electroless plating method after a portion of the entirety of metal foam or metal aerogel is put in a solution that is manufactured by melting a precursor of platinum or platinum alloy catalyst in an organic or inorganic solvent.

A modularized electrode coated with platinum or platinum alloy catalyst may be manufactured using a sputter deposition method for metal foam or metal aerogel (FIG. 3(c)).

In order to smooth ion movement, the modularized electrode that is manufactured using one of the above methods may be impregnated with ion conductive material to complete an electrode that can perform a function of a catalyst layer of a polymer electrolyte membrane fuel cell.

Figure 4:
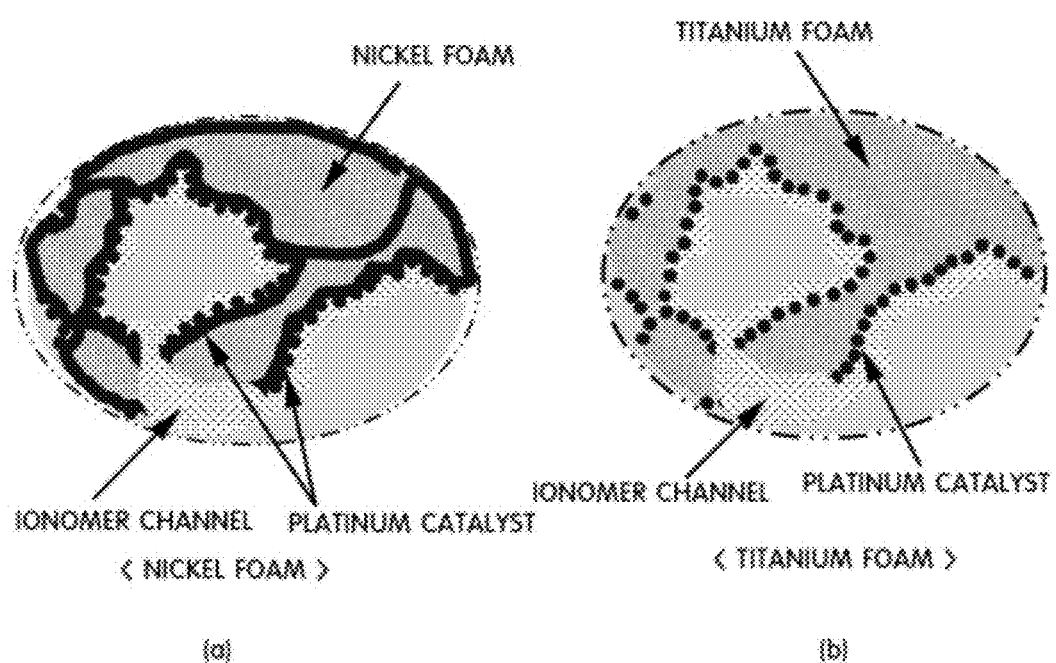
FIG. 4 is a diagram illustrating a pore structure of an electrode manufactured according to an exemplary embodiment of the present invention.

FIG. 4 is a diagram illustrating a pore structure of an electrode manufactured according to an exemplary embodiment of the present invention. The use of nickel or titanium metal foam, platinum catalyst, and ionomer that is ion conductive material is shown as an example.

As described above, since a catalyst and an electrode can be manufactured to have an integral form, an interface therebetween can be minimized, and various catalyst and metal materials can be utilized to have a pore structure of various sizes.

Thus, in the method for manufacturing an electrode according to an embodiment of the present invention, since nanoporous or microporous metal foam or metal aerogel is used, an appropriate catalyst layer and pore structure can be maintained. At the same time, an electrode with a catalyst layer integrally formed, which has various pore sizes and distributions, can be manufactured, and the control of the structures of the catalyst layer and the pores can be facilitated.

FIG. 5 is a diagram illustrating a method for a membrane-electrode assembly using a modularized electrode with a catalyst layer integrally formed using metal foam or metal aerogel according to an exemplary embodiment of the present invention.

In order to manufacture the membrane-electrode assembly for a polymer electrolyte membrane fuel cell using an electrode using metal foam and metal aerogel, various methods such as a hot pressing method may be applied, and an adhesive layer may be additionally interposed to improve the resistance miniaturization and the interface stability of a metal-polymer interface.

As shown in the left diagram of FIG. 5, in order to bonding a polymer membrane such as fluorine-based or hydrocarbon-based electrolyte membrane and an electrode using metal foam or metal aerogel, the electrode, the electrolyte membrane and the electrode are sequentially stacked, and then are bonded through hot pressing. Thus, a resistance generated when ions move on an interface between the electrolyte membrane and the electrode can be minimized.

Alternatively, as shown in the right diagram of FIG. 5, a bonding layer may be disposed between a polymer electrolyte membrane and an electrode. Thus, the interface resistance can be minimized, and the interface stability can be improved.

According to a method for manufacturing an electrode for a fuel cell, an electrode having pores of various sizes and distributions can continuously maintain an appropriate catalyst layer and pore structure during the operation period of the fuel cell, that is, a structure that facilitates movement of reaction gas, movement of electrons and ions, and discharging of water, by manufacturing nanoporous or microporous metal foam or metal aerogel with a catalyst layer integrally formed. Also, the catalyst structure and the pore structure can be easily controlled.

The invention has been described in detail with reference to illustrative embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing an electrode for a polymer electrolyte membrane fuel cell, comprising:
    providing a planar porous metal structure; and
    forming an electrode with a catalyst layer integrally formed by fixing a catalyst in the planar porous metal structure,
    wherein the providing of the planar porous metal structure comprises steps of:
        forming a first planar porous metal structure having a large pore size;
        forming a second planar porous metal structure having a relatively small pore size;
        alternatively stacking the first and second planar porous metal structures; and
        cutting, in a same direction as that of stacking the first and second planar porous metal structures, the first and second planar porous metal structures into the planar structure to form the planar porous metal structure having various pore sizes, and
    wherein the planar porous metal structure is a metal aerogel structure.

2. The method of claim 1, wherein the planar porous metal structure is selected from a group consisting of a nanoporous metal structure and a microporous metal structure.

3. The method of claim 1, wherein the planar porous metal structure has an open pore structure configured to allow gases and liquids to move, and a metal-connected structure configured to allow electrons to move.

4. The method of claim 1, further comprising impregnating the electrode with ion conductive material.

5. An electrode for a polymer electrolyte membrane fuel cell, comprising:
    a planar porous metal structure, wherein the planar porous metal structure includes:
        alternatively stacked first and second planar porous metal structures, the first planar porous metal structure having a large pore size and the second planar porous metal structure having a relatively small pore size,
        wherein the first and second planar porous metal structures are cut, in a same direction as that of stacking the first and second planar porous metal structures, into the planar structure to form the planar porous metal structure having various pore sizes; and a catalyst layer integrally formed by fixing a catalyst in the planar porous metal structure,
    wherein the planar porous metal structure is a metal aerogel structure.

6. The electrode of claim 5, wherein the planar porous metal structure is selected from a group consisting of a nanoporous metal structure and a microporous metal structure.

7. The electrode of claim 5, wherein the planar porous metal structure has an open pore structure configured to allow gases and liquids to move, and a metal-connected structure configured to allow electrons to move.

8. The electrode of claim 5, further comprising an impregnated ion conductive material.

* * * * *